United States Patent Office 2,753,012
Patented July 3, 1956

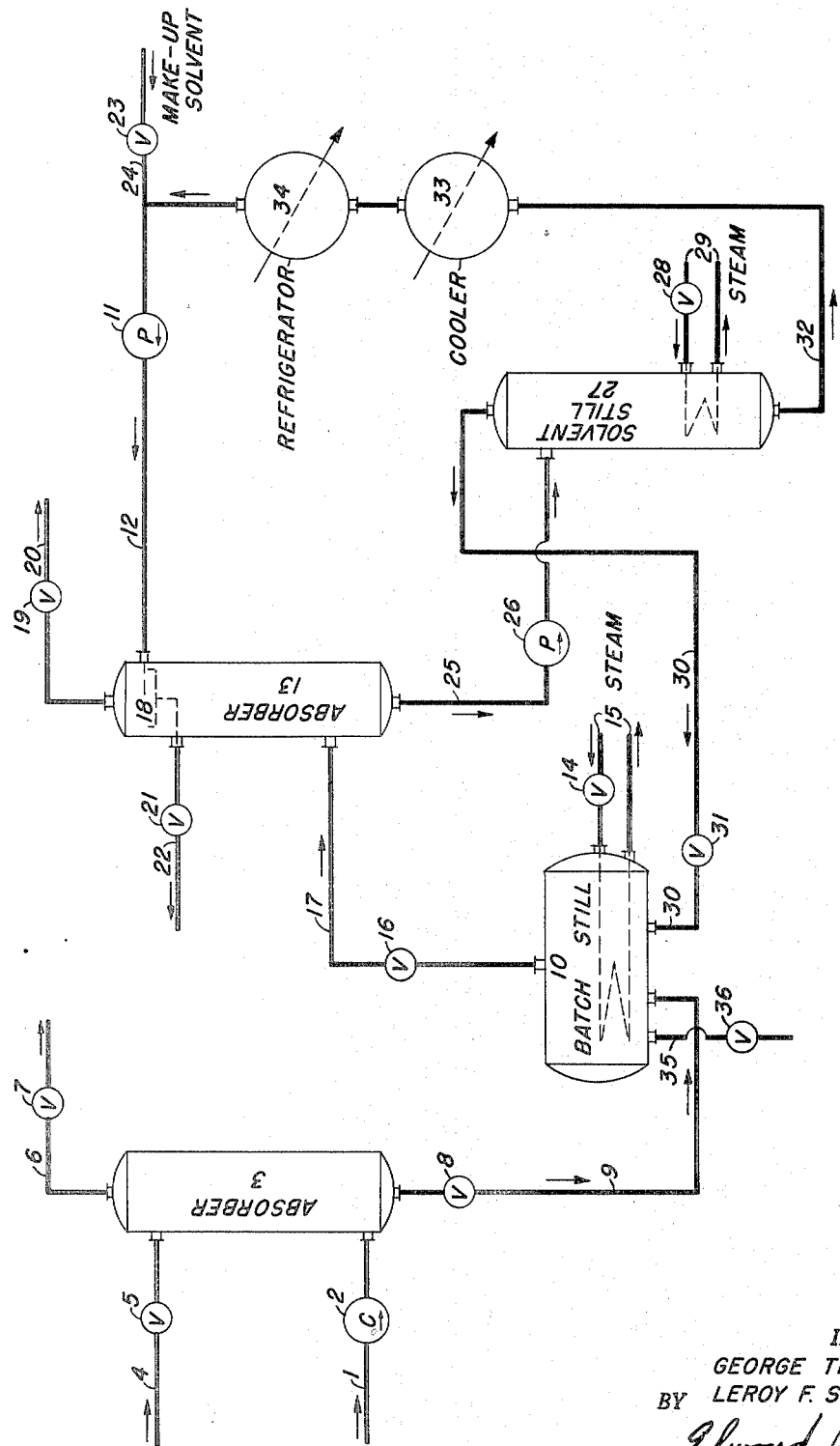

2,753,012

PROCESS FOR SEPARATING ACETYLENIC COMPONENTS FROM MIXTURES

George Thodos and Leroy F. Stutzman, Evanston, Ill., assignors to The Pure Oil Company, Chicago, Ill., a corporation of Ohio Application July 23, 1954, Serial No. 445,302

5 Claims. (Cl. 183—115)

This invention relates to a process for separating and recovering unsaturated aliphatic hydrocarbons from mixtures containing the same. More particularly, this invention relates to the separation and recovery of acetylene, acetylenic homologs and diacetylenes from mixtures containing the same by a differential absorption-distillation procedure.

Acetylene is important in industry, particularly as an intermediate in the production of various paints, synthetics and plastics; the diacetylenes and acetylenic homologs are also rapidly becoming commercially important. Many of these compounds are dangerous to handle, acetylene being particularly hazardous, since it is explosive in certain gaseous mixtures and under increased temperature and pressure; the diacetylenes are also notably dangerous. It is therefore preferable to prepare, separate and recover acetylene, higher acetylenes and the diacetylenes by a method which will minimize these dangers. Acetylene, the higher acetylenes and diacetylenes are obtained from hydrocarbons by a number of methods; natural gas, methane and other light hydrocarbons, as well as light hydrocarbon mixtures are utilized as the starting materials in the Schoch electric arc process, the Wulff regenerative furnace process, and in various processes employing partial oxidation with oxygen, partial combustion with air, and similar techniques. The Griffin-Ediger process is currently used for the production of acetylene, together with ethylene, diacetylenes and acetylenic homologs, from heavy hydrocarbon feed, such as catalytic cycle stock and the like. This latter method involves electropyrolysis, transient electric arcs between mobile carbon granule electrodes providing transient high temperatures and pressures necessary for cracking. A typical product gas from the Griffin-Ediger process has the following composition:

| | Percent |
|---|---|
| Acetylene | 41.8 |
| Ethylene | 15.7 |
| Tail gas | 24.0 |
| Carbon black | 18.5 |

Tail gas is composed of:

| | Percent |
|---|---|
| $H_2$ | 24.6 |
| $CH_4$ | 11.5 |
| $C_2H_6$ | 6.2 |
| $C_3H_4$ | 9.3 |
| $C_3H_6$ | 1.9 |
| $C_4H_2$ | 20.3 |
| $C_4H_5$ | 14.5 |
| $C_4H_6$ | 6.2 |
| Other | 5.5 |

Acetylene is easily separated and purified from gaseous mixtures containing compounds of dissimilar boiling points by absorption with a selective solvent or adsorption on a selected solid, followed by simple distillation or elution and distillation; acetylene is also occasionally converted to another substance by chemical reaction where it is present as an impurity. Cooling and liquefaction of a gaseous mixture containing acetylene, followed by a decrease in pressure or an increase in temperature to boil off the acetylene is also employed. But where acetylene is present together with other gaseous aliphatics of similar boiling points such as in the gaseous mixtures obtained from the above-mentioned hydrocarbon cracking processes, the above methods are not satisfactory to efficiently separate acetylene. Extractive distillation is resorted to, utilizing a solvent highly selective for acetylene. Such a process has the advantage of purifying the acetylene while in a convenient solution form, thus reducing explosion dangers and facilitating handling, storage, etc. None of the above processes, however, are particularly well adapted for the substantially total recovery of utilizable hydrocarbon gases present in a mixture such as the product gas of the Griffin-Ediger process.

It is an object of this invention to provide a safe, simple, economical process for the recovery of unsaturated hydrocarbons from mixtures containing the same. It is another object of this invention to afford substantially complete separation and recovery of acetylene, the diacetylenes and the acetylenic homologs as individual fractions from a gaseous mixture containing the same. It is another object of this invention to provide an improved selective absorption-differential distillation process for the recovery of purified acetylene, diacetylenes and acetylenic homologs from a gaseous mixture without expenditure of solvent. Other objects and advantages of the present invention will be evident to one skilled in the art.

We have found that acetylene, acetylenic homologs and the diacetylenes can be efficiently separated from each other and obtained in purified form either as gases or in liquid solvent by the use of a selective solvent, together with a special distillation procedure involving recycling of the higher boiling components. Danger of explosion of the acetylene or other unsaturated components is reduced by the selective absorption in a liquid solvent and minimized by the separation and recovery of the purified acetylene, diacetylenes and acetylenic homologs dissolved in liquid solvent. Simple equipment is used in our process so that initial and maintenance costs are low; the process does not involve the use of expensive refrigeration or high pressure or high temperature equipment. When the process is operated batchwise, an added factor of safety is present due to the closed system and limited amount of feed gas present at any one time in the system. This process may also be continuously operated. There is no expenditure of solvent in the process except where the hydrocarbons are recovered as liquid products.

In general, our invention comprises contacting a gaseous mixture containing one or more of the following unsaturated aliphatic hydrocarbon gases, namely, acetylene, the diacetylenes and acetylenic homologs, with a selective liquid solvent. After the acetylene, acetylenic homologs and diacetylenes present in the feed gas have been absorbed in the solvent, the extract is subjected to heating and the resulting vapor containing the lowest-boiling components is countercurrently contacted with pure solvent, the lowest-boiling components being recovered as a product; impurities in the vapors are removed in the contacting solvent and the latter is subjected to stripping and the stripping effluent recycled to force out of solution more lower-boiling hydrocarbons, each hydrocarbon being completely forced out of solution according to its volatility in the solvent and recovered in purified form.

In order to more completely and adequately describe our invention, reference is now made to the accompanying figure which illustrates an arrangement of apparatus for the performance of the process of our invention. It shows a selective solvent batch distillation arrangement. A gaseous mixture containing one or more of the following gases—acetylene, diacetylenes and acetylenic homologs—is passed as a feed gas through line 1 and compressor 2 into absorber 3 where it is countercurrently contacted, preferably at 110 p. s. i. g. pressure and 80° F. temperature, with a suitable solvent selective for acetylene, acetylenic homologs and the diacetylene, the solvent having entered through line 4 and valve 5. The solvent absorbs acetylene, methyl and higher acetylenes and the diacetylenes, allowing hydrogen and the small amounts of methane, ethane and ethylene or other light gases which may be present to pass overhead through line 6 and valve 7 as waste gases. The enriched solvent containing absorbed acetylene, acetylenic homologs and the diacetylenes is introduced through valve 8 and line 9 into batch still 10. After the still is charged, valve 8 in line 9 is closed and a small quantity of pure solvent, the same as that used in absorber 3, is run through pump 11 and line 12 into absorber 13; while the solvent passes down through absorber 13, batch still 10 is heated to from 80° F. to about 155° F. by means of the introduction of closed steam through valve 14 into line 15. The pressure in still 10 may be about 5 p. s. i. g. and boiling begins in the acetylenes-rich solvent. The vapors which rise from the enriched solvent in batch still 10 enter near the bottom of absorber 13 after passing through valve 16 and line 17; said vapors then pass upwardly in absorber 13 countercurrent to the flow of solvent and are scrubbed by said solvent of methyl acetylene and higher homologs of acetylene, together with the diacetylenes and similar hydrocarbons. Pure selective solvent introduced to absorber 13 through pump 11 and line 12 also is employed as reflux in the top tray 18 in absorber 13 under such conditions of operation so as to produce either a gaseous overhead product consisting essentially of acetylene, which is then removed from absorber 13 through line 20 and valve 19, or an overhead liquid product consisting essentially of an equilibrium solution of acetylene in the selective solvent, which is removed from absorber 13 through valve 21 and line 22. In the case of the recovery of liquid product, the conditions of operation are at the bubble point of the liquid mixture, and in the case of recovery of gaseous product, the conditions of operation are at the dew point of the gaseous mixture. Where acetylene is withdrawn as a liquid product, it is in equilibrium in the approximate proportions of 1 to 8 in the selective solvent. Additional solvent in this case is necessary to balance the system and is added to absorber 13 through valve 23 and line 24.

After the complete removal of acetylene, the solvent remaining in the bottom of absorber 13 and containing methyl acetylene, higher acetylenic homologs, the diacetylenes and similar hydrocarbons removed as impurities from the acetylene vapor is passed through line 25 and pump 26 to solvent still 27 which it enters at a point in the side near the top and not below the middle. The thus introduced enriched solvent constitutes the charge in the stripping operation. Heat, preferably temperatures of about 155° F., is applied to the solvent in solvent still 27 by passing closed steam through valve 28 and line 29. The diacetylenes, methyl acetylene and the higher homologs of acetylene are recovered as overhead from the top of solvent still 27 and are passed through line 30 and valve 31 to batch still 10 to mingle with enriched solvent newly introduced from absorber 3 through valve 8 and line 9 into batch still 10. Pressure in still 27 is maintained just sufficient to cause vapor to flow back to still 10. Lean solvent issues from the bottom of solvent still 27 through line 32 as the residue of the stripping operation and is drawn by pump 11 up through a water cooler 33 and a refrigerated cooling means 34 having sufficient operating capacity to lower the temperature of the denuded solvent to about —40° F. The cooled, pure solvent is returned by pump 11 and line 12 to absorber 13, as recycle solvent.

The process is continued until the solvent in batch still 10 is loaded with methyl acetylenes and higher acetylenes, together with the diacetylenes and similar acetylenic hydrocarbons; these hydrocarbons gradually accumulate in batch still 10, as still residuum and as recycle overhead from solvent still 27. As the concentration of these hydrocarbons in the solvent in batch still 10 increases, the efficiency and speed of separation of any acetylene present in the solvent increases, the components of highest relative volatility being forced out of solution by the components of lower volatility. When still 10 is filled with solvent containing substantially only methyl acetylene and higher acetylenes and the diacetylenes, then the component present with the highest relative volatility vaporizes from the solvent and passes into absorber 13 through valve 16 and line 17; it is recovered as gaseous or liquid product through valve 19 and line 20 or valve 21 and line 22, respectively, after countercurrent contacting with pure selective solvent in absorber 13. That is, the procedure by which acetylene was recovered is repeated until all of the component in batch still 10 with the highest relative volatility is volatilized, purified and recovered. The procedure continues for the other acetylenic components in the order of decreasing relative volatilities until all desired hydrocarbons have been substantially totally separated and recovered.

Temperatures and pressures have to be adjusted for each constituent separated from the mixture. For example, if methyl acetylene is the component separated next after acetylene, the temperature in still 10 has to be adjusted to approximately 110° F. and the pressure remains the same; in such a case, absorber 13 may be operated so that the temperature at the top of the absorber is —20° F., at 5 p. s. i. g. The temperature in still 10 will be increased sufficiently for each constituent so that each constituent distills substantially completely, and conditions in absorber 13 will be regulated to allow only the desired constituent to pass overhead as vapor or be removed from absorber 13 in liquid solvent. After the operation is completed, denuded solvent is removed from still 10 through line 35 and valve 36 and may be returned to absorber 3 through line 4 and valve 5.

The process may be operated semi-continuously instead of batchwise by leaving valve 8 in line 9 open rather than closing it after the introduction of enriched solvent to batch still 10; newly enriched solvent from absorber 3 when the process is semi-continuous enters still 10 while vaporization of the most volatile acetylenic hydrocarbon is carried on in still 10. Such an introduction of newly enriched solvent and simultaneous removal of the most volatile acetylenic component absorbed in the solvent continues until still 10 is loaded to capacity with solvent. At this point valve 8 will have to be closed and distillation continued until the solvent is substantially completely denuded of acetylene. At this point the partially denuded solvent may be withdrawn from still 10 through line 35 and valve 36 in order to provide room in still 10 for subsequent entry of newly enriched solvent from absorber 3 and line 9; or removal of the higher acetylenic homologs may be accomplished in the same still in the manner previously described. Suitable additional equipment similar to that shown and described may be provided for simultaneous or subsequent treatment of the partially denuded acetylenic mixture withdrawn from batch still 10 in order to recover less volatile acetylenic components in the mixture.

The gaseous reaction products which may be used in this batch or continuous process are any which contain the desired acetylene, diacetylenes and acetylenic homologs. They vary in the number of desirable acetylenic compounds present and in the proportion of each component. The Griffin-Ediger product gas is a non-limiting example of a suitable gaseous mixture, the Schoch and Wulff processes and other processes also producing acetylene gases of suitable nature as feed gas for the purposes of our invention.

Any liquid solvent or combination of solvents of higher boiling point than the desired acetylene, higher acetylenes and diacetylenes may be used in the process of our invention, if selective for acetylene, the acetylenic homologs and diacetylenes. Such suitable solvents are derivatives of oxy acids of phosphorus, such as their esters, amides and ester amides, analogous derivatives of oxy acids of nitrogen, such as nitrosyl amines, esters of polyhydric alcohols and esters of polybasic organic acids, polyketones, aliphatic lactones and the like. Specific examples of such suitable solvents are acetone, di-methoxy-tetra-ethylene-glycol, diethyl carbonate, dimethyl formamide, N-methyl-2-pyrrolidone, Carbitol, triethoxy ethyl phosphate, furfural, ethylene chlorhydrin, propionitrile, dichlorethyl ether, trimethyl phosphate, triethyl phosphate, tri-n-propyl phosphate, tri-n-butyl phosphate, trioctyl phosphate, tri-n-propyl phosphite, diethyl phosphate mono-diethyl amide, diethyl phosphate mono-dimethyl amide, phosphoryl tri-dimethyl amide and nitrosyl dimethylamine. We do not wish to be limited by a recital of the above specifically mentioned solvents, since any other solvents of suitable boiling point and selectivity as defined above may be used in the process of our invention. Also a different selective solvent can be used in absorber 13 from that used in absorber 3.

What are meant in this disclosure and in the attached claims by "acetylenic homologs" or "higher acetylenes" are the acetylenes of the homologous series with acetylene, that is, for example, methyl, acetylene, ethyl acetylene and propyl acetylene.

The term "diacetylenes," for the purpose of this disclosure and the attached claims, means acetylenic compounds of the series of which diacetylene, pentadiine and dipropargyl are examples. We do not wish to be limited by the above specifically named compounds; they are only illustrative of the types of compounds covered by this disclosure and the attached claims.

All equipment and pipe lines utilized in the practice of this invention are to be in accordance with spaced-volume relationships as specified for the safe handling of acetylene, that is, all vessel spaces should preferably be filled with ⅜-½ inch in diameter steel Raschig rings and steel pipe of not greater than ⅜ inch diameter should preferably be used.

Any suitable type of absorber may be employed for the absorption of acetylene, diacetylenes and acetylenic homologs from the feed gas. Thus absorber 3 may be a tower of any suitable shape packed with ⅜-½ inch steel Raschig rings. Absorber 13 may also be of any type, but utilizes ⅜-½ inch steel Raschig rings and employs countercurrent contacting of vapor and liquid. Similarly, other equivalent apparatus may be employed, and the batch still and solvent still 27 may be of any desired shape and construction. Suitable modifications will be obvious to one skilled in the art.

The following example is illustrative of the practice of our invention and a preferred mode of operation but is not to be construed as limiting our invention.

*Example*

A feed gas of the composition: hydrogen=55.8%, methane=5.7%, total olefins=9.5%, total acetylenes =27.5% and saturated aliphatics=1.5% obtained as product gas from the Griffin-Ediger process is passed into an absorber where it is contacted with acetone at 80° F. and 110 p. s. i. g. until the acetylene compounds are substantially absorbed and hydrogen, methane, olefins and aliphatics pass off as waste gases. The enriched acetone solvent is then passed into a batch still and is heated therein to 80° F. temperature at 5 p. s. i. g. pressure; the resulting vapors are passed into a second absorber where they are countercurrently contacted with acetone at about −40° F. at the top of the absorber and 5 p. s. i. g. at a ratio of 65 gallons of solvent to 6,000 cu. ft. of gas, measured at standard temperature and pressure. A mixture of acetylene is recovered as overhead gas. The wash solvent is distilled in a solvent still at 150° F. and 5 p. s. i. g. to strip it of its absorbed constituents which are returned to the batch still while stripped solvent is recycled to the second absorber after cooling. The temperature is raised in the batch still to approximately 110° F. and the procedure above described is repeated with the exception that the temperature at the top of the absorber is adjusted to about −20° F.; substantially all of the methyl acetylene passes overhead. In like manner, vinylacetylene is removed at about 115° F. and at about 0° F. at the top of the absorber. Ethylacetylene and dimethylacetylene are removed together at about 120° F., under such conditions that the temperature at the top of the absorber is about 30° F. Diacetylene is removed at about 125° F. from the batch still and the temperature at the top of the absorber is about 60° F.

It should be understood that this process is not limited to the specific temperatures and pressures described or to the specific ratio of gas to solvent enumerated, but on the contrary, these may be varied within such limits as will give effective separation of the different acetylenic hydrocarbons.

This invention not only resides in the specific embodiments described and the steps thereof, but in the relationship of the steps to each other and in the cooperation between the steps to produce an integrated process.

We particularly point out and distinctly claim as our invention:

1. A process for separating and recovering acetylenes from a gaseous mixture containing the same which comprises the steps of containing the mixture with a solvent selective for said acetylenes, heating the resulting acetylenes-enriched solvent to a temperature sufficient to vaporize absorbed hydrocarbons, maintaining a body of said heated acetylenes in enriched solvent, countercurrently contacting vapors produced from said body in a contacting zone with fresh solvent and separating the acetylenic hydrocarbon of highest volatility therein from acetylenic hydrocarbons of lower volatility, removing said less volatile acetylenic hydrocarbons from solvent in a separate stripping zone and recycling said less volatile acetylenic hydrocarbon vapors to said body of heated acetylenes in enriched solvent, recycling stripped solvent to said contacting zone and continuing said process until substantially all of the hydrocarbon of highest volatility is separated and recovered and until the other acetylenic components are successively separated as fractions and recovered.

2. A process for separating and recovering acetylene, acetylenic homologs and diacetylenes from a gaseous mixture containing the same which comprises the steps of contacting the mixture with a solvent selective for acetylene, acetylenic homologs and diacetylenes in a first absorber whereby said hydrocarbons are absorbed and other gaseous components are substantially unabsorbed, heating the resulting acetylenes-rich solvent in a batch still and producing vapors of acetylene while maintaining remaining absorbed acetylenes and enriched solvent as a heated body, countercurrently contacting said vapors as they rise from the batch still into a second absorber with fresh solvent to remove higher acetylenes and diacetylenes from acetylene vapors, recovering purified acetylene, passing the wash solvent containing said higher acetylenes and diacetylenes scrubbed from said acetylene vapor to a separate solvent still and therein removing said dissolved acetylenic hydrocarbons as overhead vapors and recycling said vapors to said body of heated acetylenes and solvent, recycling stripped solvent to said second absorber, continuing said process until substantially all of said acetylene is separated and recovered and until said acetylenic homologs and diacetylenes are successively separated and recovered in order of their decreasing relative volatilities.

3. The process of separating and recovering acetylenes from a selective solvent which comprises the steps of heating solvent containing a mixture of acetylenic compounds to a temperature sufficient to vaporize acetylenic compounds, maintaining a body of said heated acetylenic compounds in enriched solvent countercurrently contacting vapors produced from said body in a contacting zone with fresh solvent and separating the acetylenic compound of highest volatility therein from acetylenic hydrocarbons of lower volatility, removing said less volatile acetylenic hydrocarbons as vapors from said solvent in a separate stripping zone and recycling said less volatile acetylenic hydrocarbon vapors to said heated body of acetylenic compounds in enriched solvent, recycling stripped solvent to said contacting zone, continuing said process until substantially all of the acetylenic compound of highest volatility is separated and recovered and until the other acetylenic components are successively separated and recovered.

4. The process of separating and recovering acetylene, acetylenic homologs and diacetylenes from a selective solvent which comprises the steps of heating the solvent containing said acetylenic compounds in a batch still and producing vapors of acetylene while maintaining remaining absorbed acetylenes in enriched solvent as a heated body, countercurrently contacting said vapors as they rise from the bath still into an absorber with fresh solvent to remove higher acetylenes and diacetylenes from said acetylene vapors, recovering purified acetylene, passing the wash solvent containing said acetylenic homologs and diacetylenes scrubbed from said acetylene vapors to a separate solvent still and therein removing said dissolved acetylenic hydrocarbons as overhead vapors and recycling said overhead vapors to said heated body of acetylenic compounds in enriched solvent, recycling stripped solvent to said absorber, continuing said process until substantially all of said acetylene is separated and recovered and until said acetylenic homologs and diacetylenes are successively separated and recovered in the order of their decreasing relative volatilities.

5. The process of separating and recovering acetylene, acetylenic homologs and diacetylenes from a solvent containing the same which comprises the steps of charging the solvent containing said acetylenes to a batch still and heating said enriched solvent therein to about 80–155° F. at about 5 p. s. i. g. and producing vapors of acetylene and a heated body of remaining absorbed acetylene in enriched solvent, passing said vapors to an absorber and countercurrently contacting said vapors therein with lean selective solvent for acetylenes cooled to about −40° F. to remove higher acetylenes and diacetylenes from said vapors containing acetylene, recovering purified acetylene as gaseous overhead, passing the wash solvent containing said higher acetylenes and diacetylenes scrubbed from said acetylene vapors to a separate solvent still and removing said dissolved acetylenic hydrocarbons as overhead vapors by distilling said wash solvent at a pressure above that in said batch still, recycling said acetylenic hydrocarbon vapors obtained as overhead to said heated body in said batch still, recycling stripped solvent to said absorber after cooling, continuing said process until substantially all of said acetylene is separate and recovered, raising the temperature in the batch still to approximately 110° F. and continuing said process until substantially all methyl acetylene passes overhead, increasing the temperature of said batch still to approximately 115° F. and repeating said process until substantially all vinyl acetylene passes overhead, increasing the temperature of said batch still to approximately 120° F. and repeating said process until substantially all the ethyl acetylene and dimethyl acetylene pass overhead, increasing the temperature of said batch still to approximately 125° F. and repeating said process until substantially all diacetylene passes overhead.

References Cited in the file of this patent

UNITED STATES PATENTS

| | | |
|---|---|---|
| 1,989,273 | Grimme et al. | Jan. 29, 1935 |
| 2,522,059 | Ray et al. | Sept. 12, 1950 |
| 2,540,905 | Neubauer et al. | Feb. 6, 1951 |
| 2,714,940 | Milligan | Aug. 9, 1955 |

FOREIGN PATENTS

| | | |
|---|---|---|
| 415,377 | Great Britain | Aug. 17, 1934 |

OTHER REFERENCES

Article in Petroleum Refiner, vol. 32 No. 11, Nov. 1953, pages 118–120.